(12) United States Patent
Choy et al.

(10) Patent No.: US 6,233,788 B1
(45) Date of Patent: May 22, 2001

(54) INTEGRALLY MOLDED CLIP AND CLIP ASSEMBLY

(75) Inventors: Chong Heng Choy; Wai Kee Chan, both of Singapore (SG); Dave Kallis, Morton Grove; Kenneth Chung, Lindenhurst, both of IL (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/447,857

(22) Filed: Nov. 23, 1999

(51) Int. Cl.[7] .................................................. A45F 5/00
(52) U.S. Cl. ............................. 24/3.12; 24/669; 24/664; 224/197; 224/271
(58) Field of Search ........................... 24/3.11, 3.12, 24/664, 669; 224/271, 197–199, 272, 242, 930; 455/100; 379/455

(56) References Cited

U.S. PATENT DOCUMENTS

| | | | |
|---|---|---|---|
| 4,419,794 | * | 12/1983 | Horton, Jr. et al. . |
| 5,452,497 | * | 9/1995 | Peng . |
| 5,622,296 | * | 4/1997 | Pirhonen et al. . |
| 5,730,342 | * | 3/1998 | Tien . |
| 5,779,115 | * | 7/1998 | Parkas et al. . |
| 5,850,996 | * | 12/1998 | Liang . |
| 5,906,031 | | 5/1999 | Jensen . |
| 6,006,969 | * | 12/1999 | Kim . |
| 6,098,858 | * | 8/2000 | Laugesen . |
| 6,161,741 | * | 12/2000 | French . |

FOREIGN PATENT DOCUMENTS 9701336-1    9/1998   (SE) .

* cited by examiner

Primary Examiner—James R. Brittain
(74) Attorney, Agent, or Firm—Daniel R. Collopy; Michael C. Soldner

(57) ABSTRACT

An integrally molded clip (10) and clip assembly (30) has a back (11), a front (12), a bridging member (13) and spigot guide tracks (20). Front (12) has a socket (15) and a locking member (16) that is biased to a spigot locking position and having a free end providing part of a side wall (18) of socket (15). Locking member (16) is pivotal about a pivotal axis (21) provided by a pivotal mount (22) on front (12) and has a lock release member (23) extending away from socket (15). A protrusion (24) in socket (15) is biased by a rib (25) to engage one of slots (34) on a spigot (31) that enables different locking positions of a portable electronic device using assembly (30). The device is rotatable when spigot (31) is engaged with socket (15) and detachable from clip (10) when a user actuates lock release member (23).

18 Claims, 3 Drawing Sheets

INTEGRALLY MOLDED CLIP AND CLIP ASSEMBLY

FIELD OF THE INVENTION

This invention relates to integrally molded clips and clip assemblies. In particular, this invention relates to, but is not necessarily limited to, clips and clip assemblies for rotatably attaching a portable electronic device to apparel worn by a user.

BACKGROUND OF THE INVENTION

Portable electronic devices, such as portable communication devices, are known to be attached by clips or holsters to apparel such as, for example, waist belts worn by users. When attached in this manner, a user may wish to detach a portable electronic device when use of the device is desired.

In some instances, a portable electronic device requires different positions when attached to a user's apparel. For example, a display of a portable electronic device needs to be positioned such that a user can read information displayed. Different positions for a portable electronic device can be provided with a rotatable clip. For example, U.S. Pat. No. 5,906,031 describes a rotatable clip with a locking structure to engage a cleat that is assembled and attached to a portable electronic device. However, the portable electronic device described in U.S. Pat. No. 5,906,031 has to be oriented at a single specific position in order for the clip to engage the cleat and is lockable only at one position when thus engaged. Orienting the device to that single specific position can be a problem when the user is in a hurry and wants to quickly attach it to the clip. It would therefore be advantageous if a user could attach or detach the device by a simple procedure without having to consider its orientation or even without looking at the relative position of the clip or the device. Also known are belt clips that use a guide for guiding a spigot into a socket. When the spigot is in the socket for such belt clips, a simple lock maintains the spigot in the socket such that a portable electronic device associated with the spigot can freely rotate.

SUMMARY OF THE INVENTION

According to one aspect of the invention, there is provided an integrally molded clip that includes a back and a front spaced and connected to each other by a bridging member. The front includes a socket and a locking member biased to a spigot locking position, with the locking member having a spigot engagement member extending towards the socket with a free end providing at least part of a side wall of the socket. The socket has at least one engagement member for engaging one or more complimentary engagement members of a spigot to thereby restrict rotation of the spigot when engage with the socket.

According to another aspect of the invention, there is provided a clip assembly that includes an integrally molded clip having a back and a front spaced and connected to each other by a bridging member. The front includes a socket and a locking member biased to a spigot locking position. The locking member has a spigot engagement member extending towards the socket with a free end providing at least part of a side wall of the socket. A spigot extends from a mount, the spigot being configured to engage with the socket, whereby when the spigot is engaged with the socket, the spigot is rotatable relative to the clip. The socket has at least one engagement member for engaging one or more complimentary engagement members of the spigot to thereby restrict rotation of the spigot when engaged with the socket.

BRIEF DESCRIPTION OF THE DRAWINGS

In order to describe the invention and to put it into practical effect, reference will now be made to a preferred embodiment of the invention as illustrated with reference to the accompanying drawings in which.

DETAILED DESCRIPTION OF THE INVENTION

Figure 1:
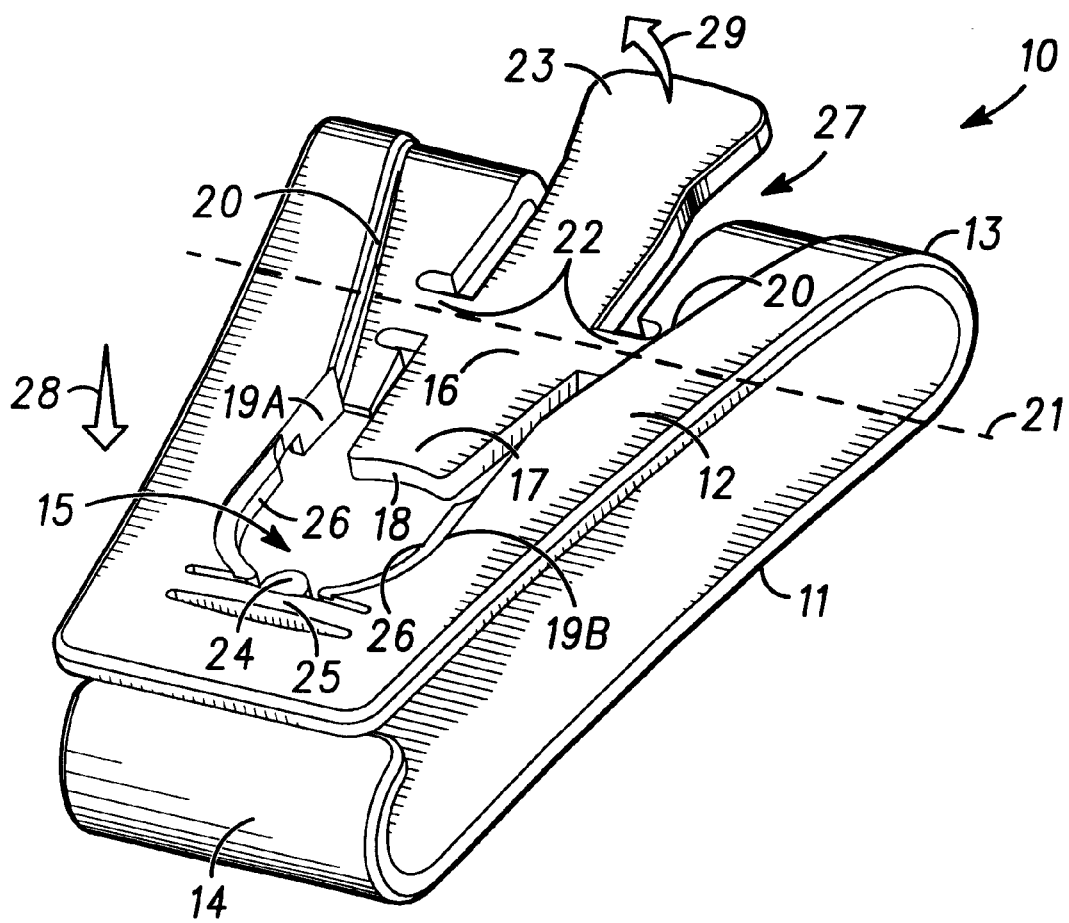
FIG. 1 is a perspective view of an integrally molded clip in accordance with a preferred embodiment of the invention.

Referring to FIG. 1, a perspective view of an integrally molded clip 10 is shown in accordance with a preferred embodiment of the invention. Clip 10 comprises a back 11 and a front 12 spaced and connected to each other by a bridging member 13. Back 11 has a hooked member 14 distal from bridging member 13 and spacing back 11 and front 12. Front 12 comprises a socket 15 and a locking member 16 that is biased to a spigot locking position. Locking member 16 has a spigot engagement member 17 extending towards socket 15 with a free end providing at least part of a side wall 18 of socket 15. Remaining parts of side wall 18 of socket 15 is identified by reference numerals 19a and 19b. Locking member 16 is disposed between spigot guide tracks 20 in front 12 and is pivotal about a pivotal axis 21 of a pivotal mount 22 on front 12. Spigot guide tracks 20 are coupled to socket 15 and are inwardly tapered towards socket 15.

As illustrated, pivotal axis 21 is transverse relative to spigot guide tracks 20. Locking member 16 also includes a lock release member 23 extending away from socket 15. An engagement member of socket 15 is formed by a protrusion 24 biased by a rib 25. Protrusion 24 is transverse to rib 25 and both protrusion 24 and rib 25 are integral with clip 10. A rim 26 of front 12 partially surrounds socket 15 and is associated with spigot guide tracks 20. Bridging member 13 has a recess 27 proximal to lock release member 23.

Figure 2:
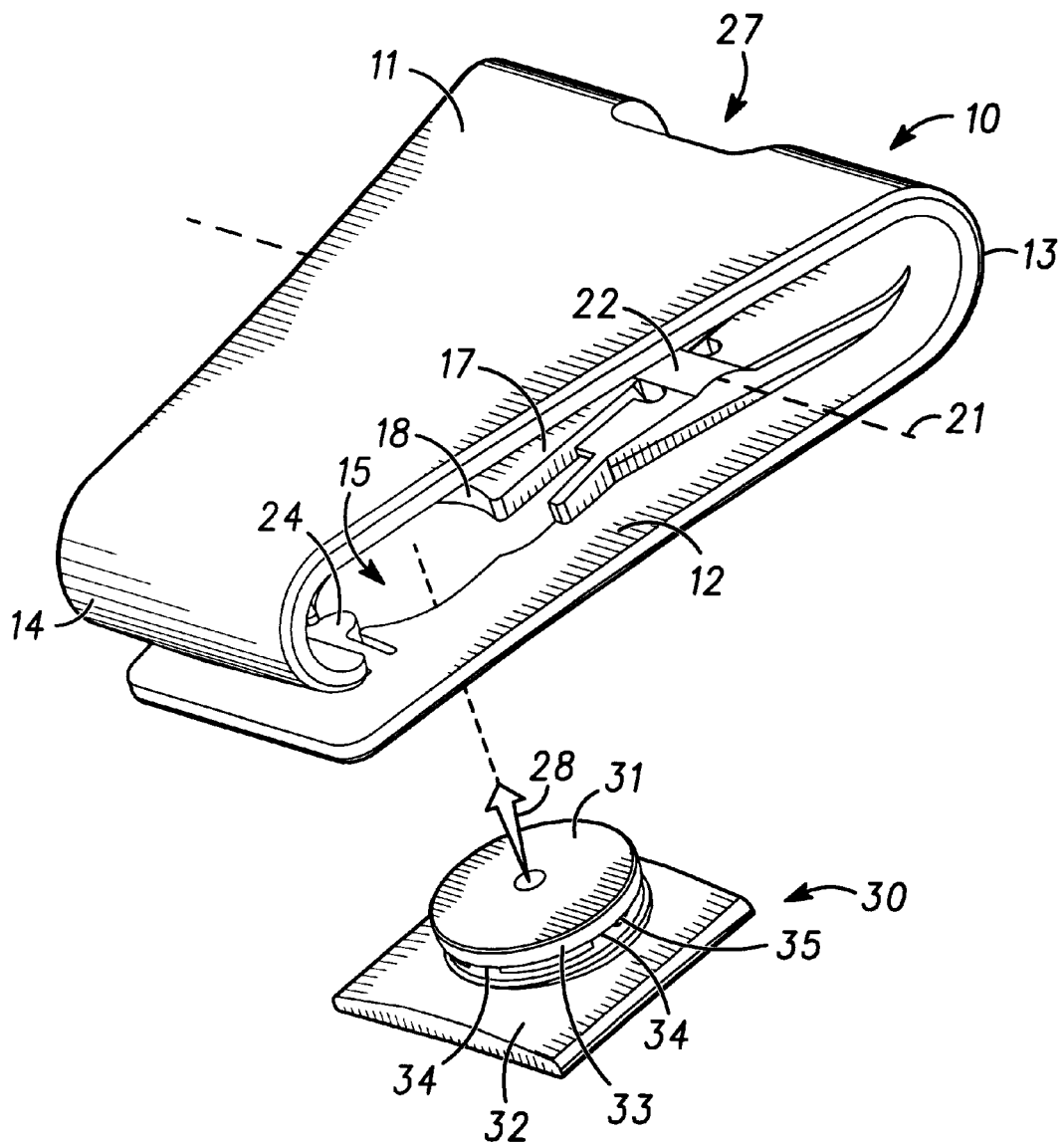
FIG. 2 is an exploded perspective view of a clip assembly having the integrally molded clip of FIG. 1.

Referring now to FIG. 2, there is shown an exploded perspective view of a clip assembly 30 aligned with clip 10. In addition to clip 10, assembly 30 comprises a spigot 31 extending from a mount 32 and having an annular flange 33. Spigot 31 and mount 32 can be part of a housing for a portable electronic device (not shown) such as a portable communication device or an attachment to such a device as is known in the art. Spigot 31 also has complementary engagement members in the form of slots 34 disposed between annular flange 33 and mount 32. In this embodiment, slots 34 are spaced apart by ninety degrees (only two of which are shown).

In operation, clip 10 is attached to a user's apparel such as, for example, a waist belt. When attached, bridging member 13 and hooked member 14 are respectively at the top and the bottom of the waist belt. With clip 10 attached to the waist belt, the user can then mount a portable electronic device having spigot 31 to clip 10. The portable electronic device is not shown in the accompanying drawings in order to simplify describing the preferred embodiment of the invention. However, spigot 31 and mount 32 can be part of a housing for the portable electronic device or can be an attachment that is mountable to such a device.

To mount the portable electronic device to clip 10, the user guides spigot 31 between spigot guide tracks 20 into socket 15 and then pushes spigot 31 against locking member 16 in a direction shown by arrow 28 in FIG. 1. When spigot 31 is engaged with clip 10 in a spigot locking position, side wall 18 contacts an edge of annular flange 33 and rim 26 abuts an underside 35 of annular flange 33. In the spigot locking position, the portable electronic device is rotatable by the user such that each of slots 34 is engageable with protrusion 24 to provide different locking positions for the device. When protrusion 24 engages one of the slots 34, rotation of spigot 31 when engaged with socket 15 is restricted.

To rotate the portable electronic device to another position, the user has to turn the device such that spigot 31 pushes against protrusion 24 and forces protrusion 24 out of a respective engaged slot 34. This thereby allows spigot 31 to rotate ninety degrees to another slot 34. Rotating the portable electronic device as described is possible because rib 25 is movable by a force provided by corresponding rotation of spigot 31 against protrusion 24. Thus, spigot 31 is configured to engage with socket 15, whereby when spigot 31 is engaged with socket 15, spigot 31 is rotatable relative to clip 10 and lockable at different positions that are provided when protrusion 24 engages each of slots 34.

To detach the portable electronic device from clip 10, the user needs to disengage spigot 31 from socket 15. This requires the user to actuate lock release member 23 in a direction indicated with arrow 29 in FIG. 1. Space for actuating lock release member 23 in that direction is provided by recess 27. When lock release member 23 is actuated, spigot 31 is partially moved out of socket and acts upon spigot engagement member 17 to maintain spigot engagement member 17 in an unlocked position. This unlocked position allows the user to fully disengage spigot 31 from the spigot locking position in socket 15 and out of clip 10.

Conversely, when spigot 31 is being guided along guide tracks 20 into socket 15 during mounting of a portable electronic device described earlier, spigot 31 urges spigot engagement member 17 to the unlocked position until operatively engaged with socket 15.

Figure 3:
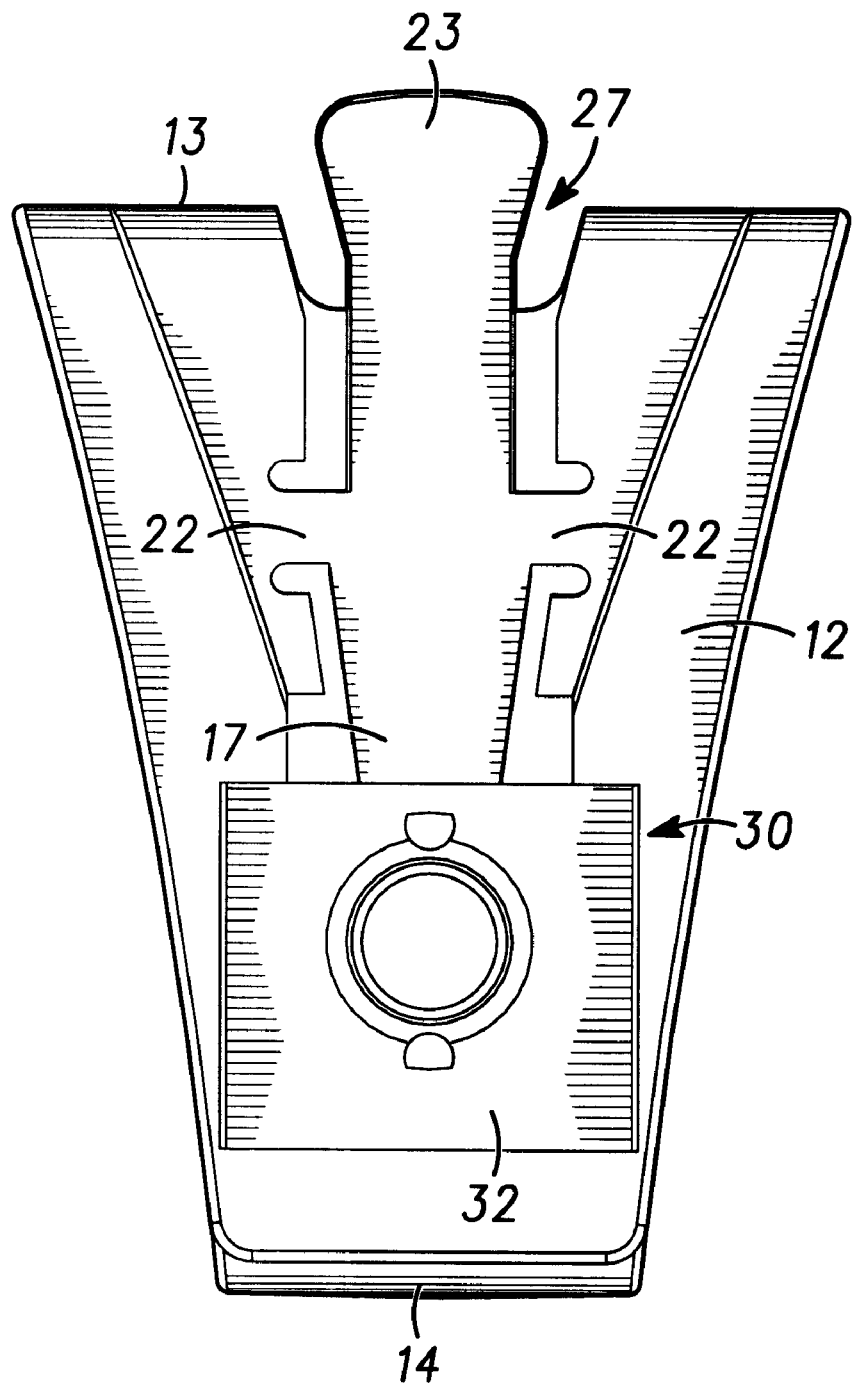
FIG. 3 is a front view of the clip assembly of FIG. 2 when assembled.

Referring to FIG. 3, a front view of the clip assembly 30 with mount 32 clearly visible. Lock release member 23 is coupled to the clip assembly via two arms of the pivotal mount 22. When lock release member 23 is rotated backward, the spigot engagement member 17 enables the release of the mount 32.

Advantageously, the invention enables a portable electronic device associated with spigot 31 to be selectively rotated to different locking positions. Consequently, the invention enables the user to attach or detach the device by a simple procedure of actuating lock release member 23 and moving the device out of socket 15 without having to consider the device's orientation or even without looking at relative positions of clip 10 or the device. Furthermore, the device can be positioned in more than one locking position with protrusion 24 engaging each of slots 34 so as to accommodate different orientations when the device is attached to the user's apparel. Accordingly, the device associated with spigot 31 is restricted in movement and therefore does not freely rotate. An additional advantage of the invention is that clip 10 is a single molded piece and this makes clip 10 cheaper than conventional rotatable clips having multiple parts.

What is claimed is:

1. An integrally molded clip comprising:
   a back and a front spaced and connected to each other by a bridging member, said front comprising:
      a socket; and
      a locking member biased to a spigot locking position, said locking member having a spigot engagement member extending towards said socket with a free end providing at least part of a side wall of said socket,
   wherein said socket has at least one engagement member for engaging one or more complimentary engagement members of a spigot to thereby restrict rotation of said spigot when engage with said socket, and wherein said at least one engagement member is a protrusion biased by a rib, said protrusion and said rib being integral with said clip.

2. The clip as claimed in claim 1, wherein said protrusion is transverse to said rib.

3. The clip as claimed in claim 1, wherein said locking member is pivotal about a pivotal mount on said front.

4. The clip as claimed in claim 1, wherein said locking member includes a lock release member extending away from said socket.

5. The clip as claimed in claim 4, wherein said bridging member has a recess proximal to said lock release member.

6. The clip as claimed in claim 1 and further comprising one or more spigot guide tracks in said front and coupled to said socket, said guide spigot tracks being inwardly tapered towards said socket.

7. The clip as claimed in claim 6, wherein said locking member is disposed between said spigot guide tracks.

8. The clip as claimed in claim 6, wherein a pivotal axis of said locking member is transverse relative to said spigot guide tracks.

9. A clip assembly comprising:
   an integrally molded clip having a back and a front spaced and connected to each other by a bridging member, said front comprising:
      a socket; and
      a locking member biased to a spigot locking position, said locking member having a spigot engagement member extending towards said socket with a free end providing at least part of a side wall of said socket; and
   a spigot extending from a mount, said spigot being configured to engage with said socket, whereby when said spigot is engaged with said socket, said spigot is rotatable relative to said clip,
   wherein said socket has at least one engagement member for engaging one or more complimentary engagement members of said spigot to thereby restrict rotation of said spigot when engaged with said socket, and wherein said at least one engagement member is a protrusion biased by a rib, said protrusion and said rib being integral with said clip.

10. The clip assembly as claimed in claim 9, wherein said protrusion is transverse to said rib.

11. The clip assembly as claimed in claim 9, wherein said locking member is pivotal about a pivotal mount on said front.

12. The clip assembly as claimed in claim 9, wherein said locking member includes a lock release member extending away from said socket.

13. The clip assembly as claimed in claim 12, wherein said bridging member has a recess proximal to said lock release member.

14. The clip assembly as claimed in claim 9 and further comprising one or more spigot guide tracks in said front and coupled to said socket, said spigot guide tracks being inwardly tapered towards said socket.

15. The clip assembly as claimed in claim 14, wherein said locking member is dis posed between said spigot guide tracks.

16. The clip assembly as claimed in claim 14, wherein a pivotal axis of said locking member is transverse relative to said spigot guide tracks.

17. The clip assembly as claimed in claim 9, wherein said spigot is at least part of a housing for a portable electronic device.

18. The clip assembly as claimed in claim 9, wherein said spigot is an attachment to a portable electronic device.

* * * * *